US012789539B2

(12) United States Patent
Murashima et al.

(10) Patent No.: US 12,789,539 B2
(45) Date of Patent: Nov. 10, 2026

(54) DRYING APPARATUS

(71) Applicant: KYOCERA Document Solutions Inc., Osaka (JP)

(72) Inventors: Masaki Murashima, Osaka (JP); Hiroyuki Ueda, Osaka (JP); Minoru Tokonami, Osaka (JP); Mitsuhiro Goda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 363 days.

(21) Appl. No.: 18/731,208

(22) Filed: May 31, 2024

(65) Prior Publication Data

US 2024/0399767 A1 Dec. 5, 2024

(30) Foreign Application Priority Data

Jun. 5, 2023 (JP) ................................ 2023-092249

(51) Int. Cl.
*F26B 13/10* (2006.01)
*B41J 11/00* (2006.01)
*B41J 13/08* (2006.01)

(52) U.S. Cl.
CPC ........ *B41J 11/0022* (2021.01); *B41J 11/0085* (2013.01); *B41J 13/08* (2013.01)

(58) Field of Classification Search
CPC ............................................ F26B 13/101–103
USPC .......................... 34/659, 663, 648, 644, 625
See application file for complete search history.

(56) References Cited

U.S. PATENT DOCUMENTS 3,471,363 A * 10/1969 Schmidt .................. B31F 1/18
162/197

FOREIGN PATENT DOCUMENTS

JP 2020142873 A 9/2020
JP 2022175528 A 11/2022

* cited by examiner

*Primary Examiner* — Deming Wan
(74) *Attorney, Agent, or Firm* — Studebaker Brackett PLLC

(57) ABSTRACT

A drying apparatus includes an endless conveying belt, a conveying plate, and a suction device. The endless conveying belt has a number of through-holes, and supports the medium and conveys the medium in a predetermined conveyance direction. The conveying plate has a number of through-holes and supports the conveying belt in contact with an inner circumferential surface of the conveying belt. The suction device sucks air through the through-holes of the conveying belt and the through-holes of the conveying plate to attract the medium to the conveying plate. The conveying plate is formed so as to be expandable and contractable in a direction parallel to the conveyance direction.

8 Claims, 5 Drawing Sheets

DRYING APPARATUS

INCORPORATION BY REFERENCE

This application is based on and claims the benefit of priority from Japanese patent application No. 2023-092249 filed on Jun. 5, 2023, which is incorporated by reference in its entirety.

BACKGROUND

The present disclosure relates to a drying apparatus which dries a recording medium having an image under a high temperature environment while conveying the medium.

An image forming system including an inkjet recording apparatus is provided with a drying apparatus which dries the image (ink) formed on the recording medium. Such a drying apparatus includes a conveying belt having through-holes over the entire surface, a conveying plate having through-holes over the entire surface and supporting the conveying belt, and a suction part which h attracts the recording medium to the conveying belt by sucking air through the through-holes of the conveying belt and the through-holes of the conveying belt.

In the above-described drying apparatus, the conveying plate is fixedly mounted to a frame which supports the conveying belt. Under a high temperature environment during the operation of the drying apparatus, the conveying plate is heated and thermally expanded, causing the conveying plate to be flowed. Then, a gap is formed under the conveying plate, and air leaks out through the gap. As a result, a force for attracting the recording medium by the suction part is decreased, and a conveying failure and drying failure of the recording medium may occur.

SUMMARY

A drying apparatus according to the present disclosure dries a medium having an image under a high temperature environment while conveying the medium. The drying apparatus includes an endless conveying belt, a conveying plate, and a suction device. The endless conveying belt has a number of through-holes, and supports the medium and conveys the medium in a predetermined conveyance direction. The conveying plate has a number of through-holes and supports the conveying belt in contact with an inner circumferential surface of the conveying belt. The suction device sucks air through the through-holes of the conveying belt and the through-holes of the conveying plate to attract the medium to the conveying plate. The conveying plate is formed so as to be expandable and contractable in a direction parallel to the conveyance direction.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, a drying apparatus according to one embodiment of the present disclosure will be described.

Figure 1:
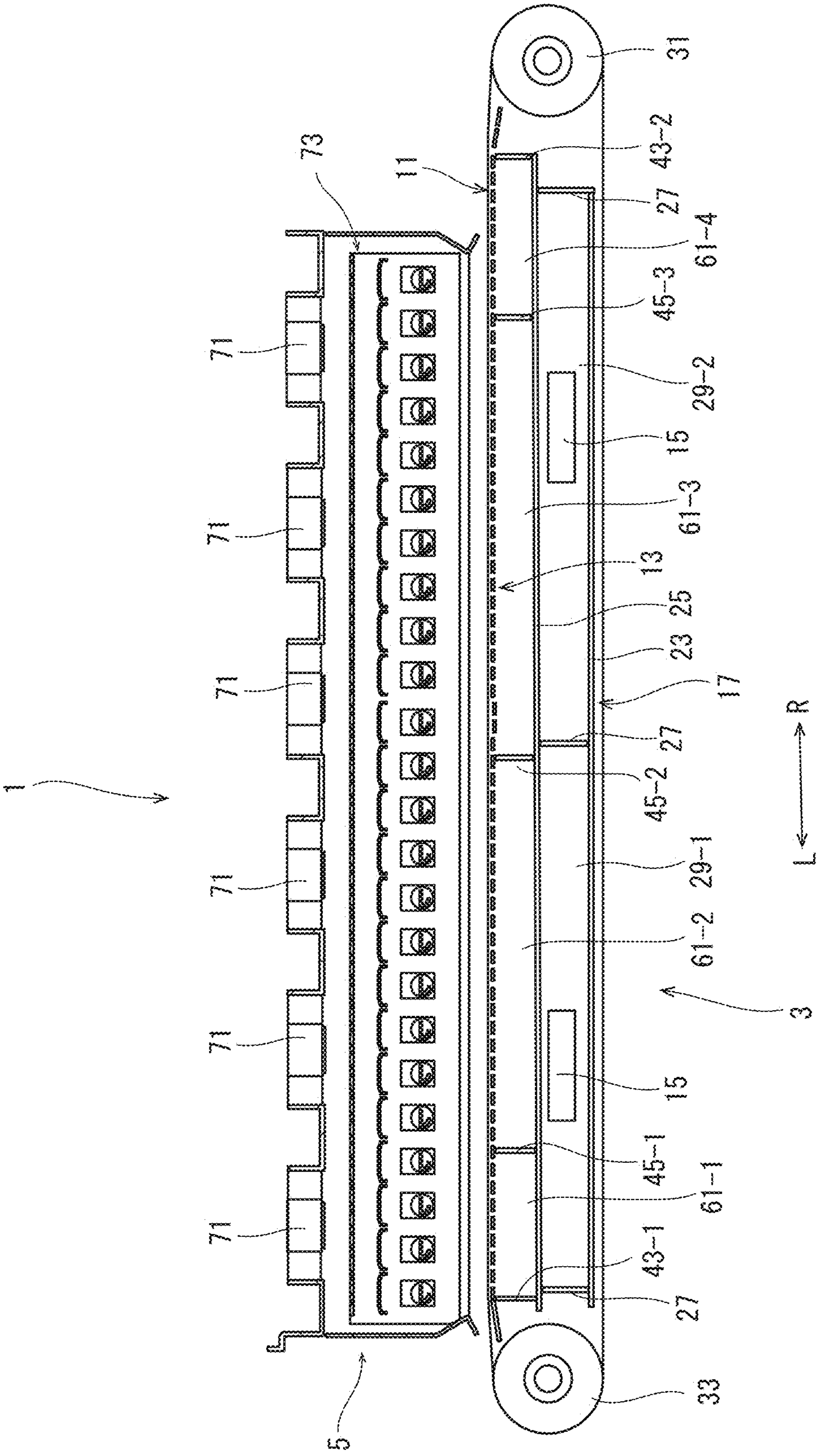
FIG. 1 is a front view showing an inner structure of a drying apparatus according to one embodiment of the present disclosure.

First, the entire structure of the drying apparatus 1 will be described with reference to FIG. 1. FIG. 1 is a front view showing the inside of the drying apparatus 1. In each figure, Fr, Rr, L, and R indicate the front side, rear side, left side, and right side of the drying apparatus 1, respectively.

The drying apparatus 1 includes a conveying unit 3 which conveys a recording medium on which an image is formed by an inkjet method, and a heating device 5 which dries the ink of the recording medium conveyed by the conveying unit 3 in a high temperature environment.

Figure 2:
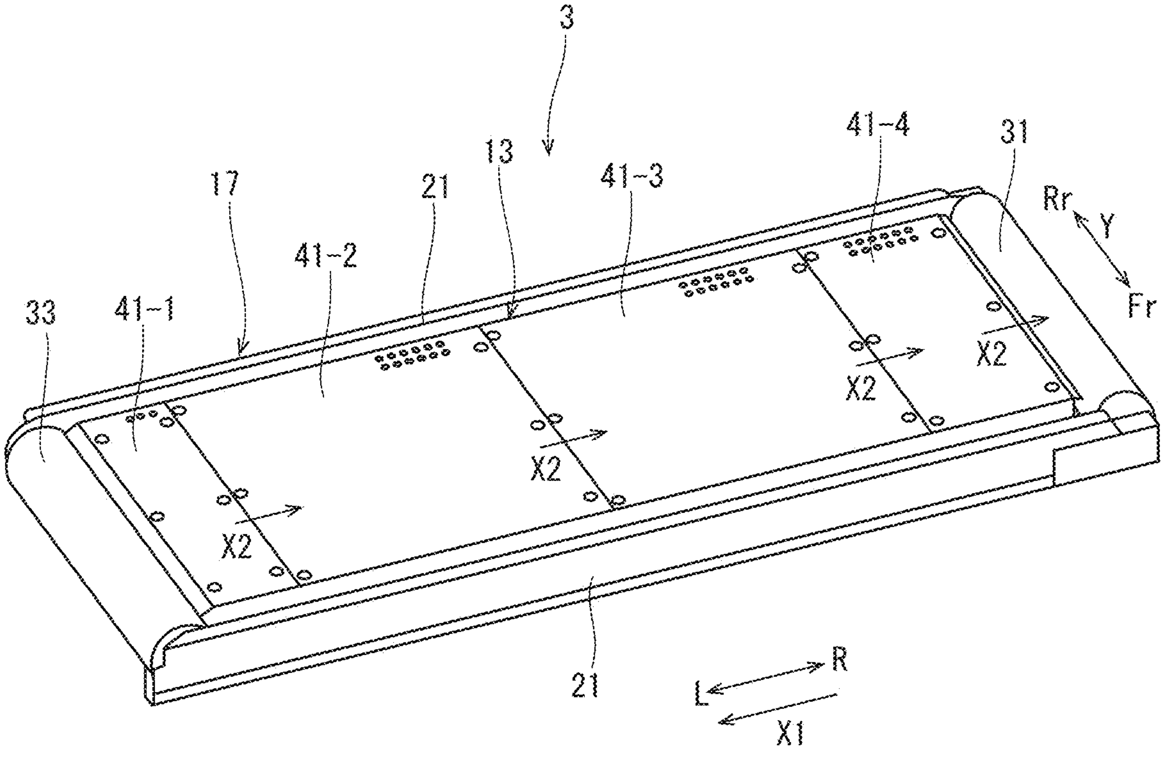
FIG. 2 is a perspective view showing a conveying unit (a conveying belt is not shown), in the drying apparatus according to one embodiment of the present disclosure.
Figure 3:
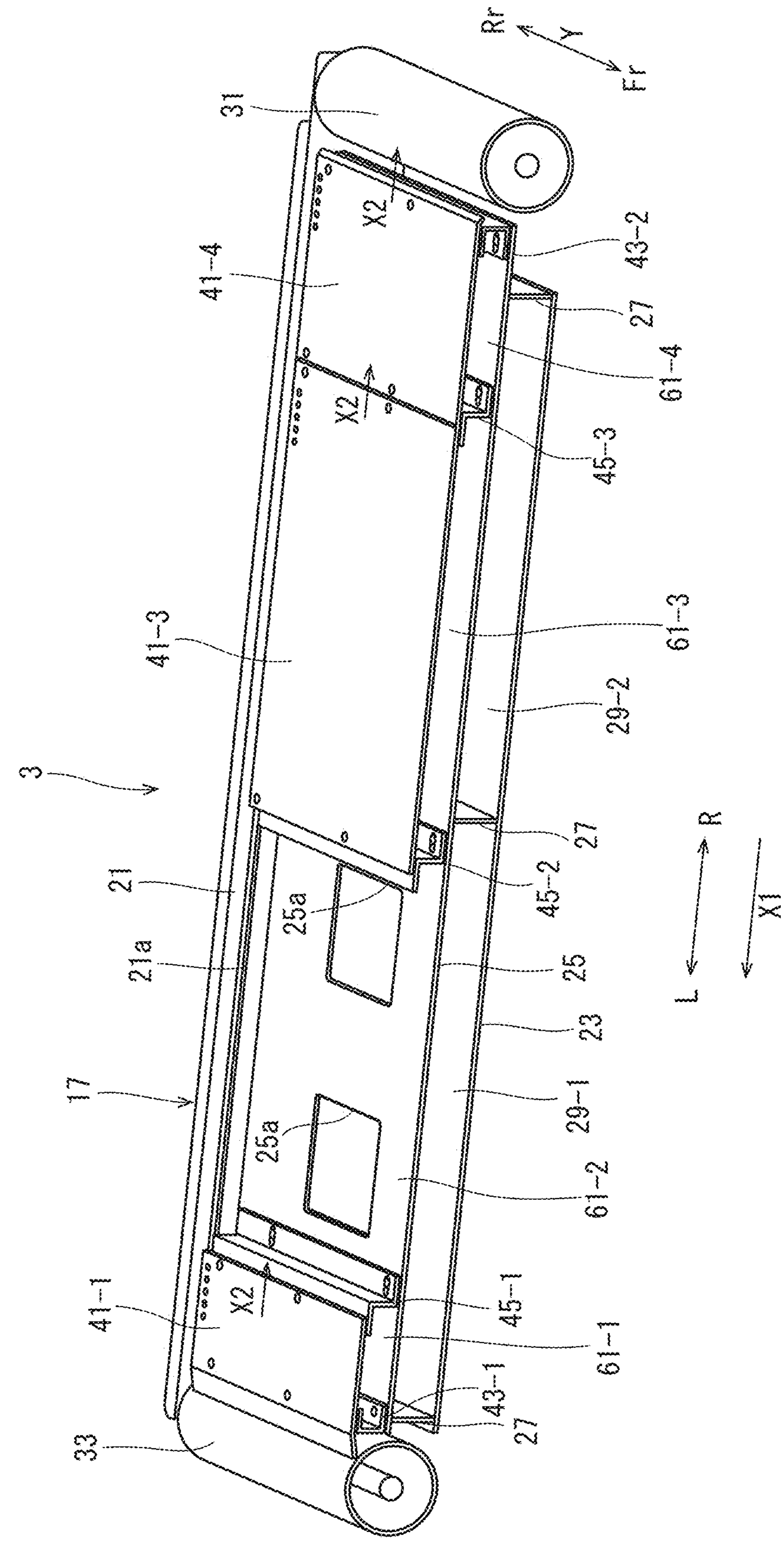
FIG. 3 is a perspective view showing the conveying unit (the conveying belt and a part of a conveying plate are not shown), in the drying apparatus according to one embodiment of the present disclosure.
Figure 4:
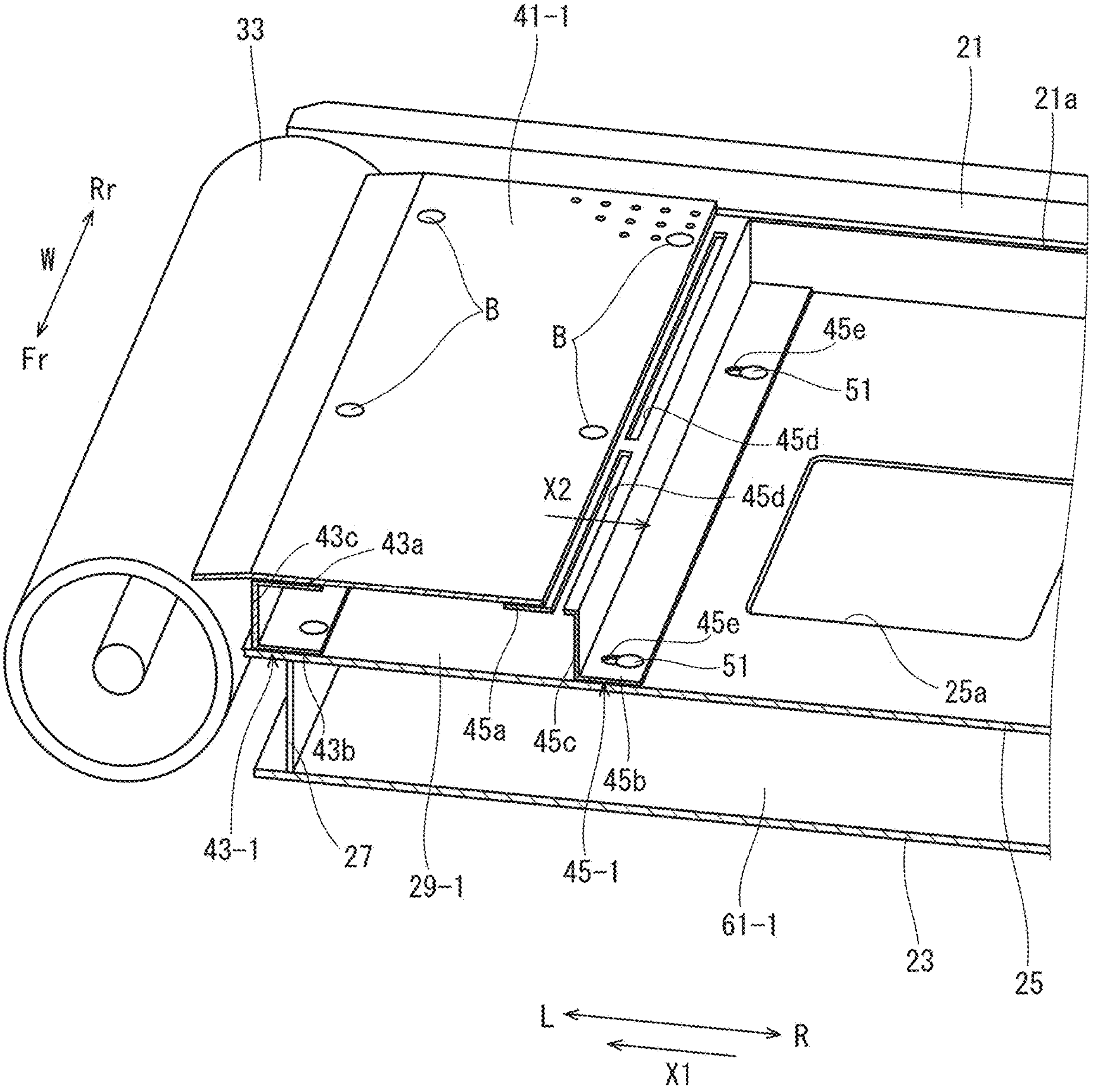
FIG. 4 is a perspective view showing the conveying plate on a side of a driving roller, in the drying apparatus according to one embodiment of the present disclosure.
Figure 5:
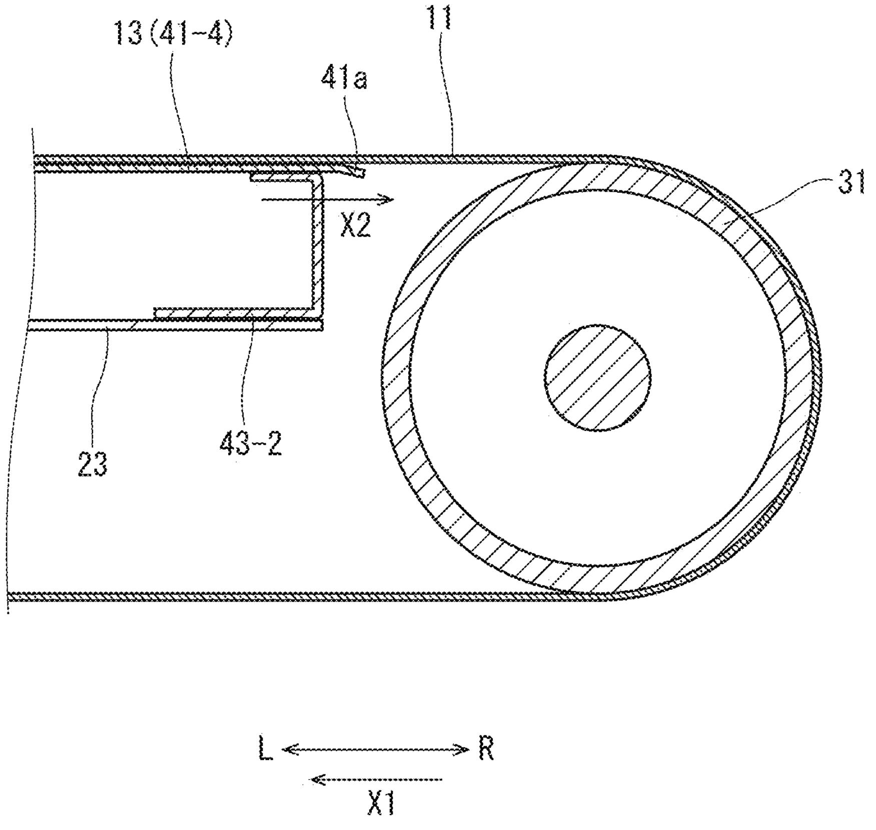
FIG. 5 is a side view showing the conveying plate on a side of a driven roller, in the drying apparatus according to one embodiment of the present disclosure.

First, the conveying unit 3 will be described with reference to FIG. 1 and FIG. 2 to FIG. 5. FIGS. 2 and 3 are perspective views showing the conveying unit 3, FIG. 4 is a perspective view showing a conveying plate 13 on a side of a driving roller 33, and FIG. 5 is a side view showing the conveying plate 13 on a side of a driven roller 31. In FIG. 2, the conveying belt 11 is not shown, and in FIG. 3, the conveying belt 11 and a part of a plate piece 41 are not shown.

The conveying unit 3 includes a conveying belt 11 which conveys the recording medium along a conveyance direction X1 from the right to the left in FIG. 1, a conveying plate 13 which supports the conveying belt 11, a suction device 15 which attracts the recording medium to the conveying belt 11, and a frame 17 which supports them.

First, the frame 17 will be described. The frame 17 has front and rear side plates 21 (see FIG. 2 and FIG. 3), a bottom plate 23 (see FIG. 3), and a support plate 25 (see FIG. 3). The front and rear side plates 21 are long in the conveyance direction X1 (the left-and-right direction), a and arranged at predetermined interval in the width direction Y (the front-and-rear direction) intercrossing the conveyance direction X1. The bottom plate 23 is provided between the front and rear side plates 21. The support plate 25 is provided between the front and rear side plates 21 above the bottom plate 23. On the inner surfaces of the front and rear side plates 21, rails 21*a* (see FIG. 3) are formed along the left-and-right direction at predetermined height positions.

As shown in FIG. 3, the space between the bottom plate 23 and the support plate 25 is divided into two lower chambers 29 (see also FIGS. 1, 29-1 and 29-2 in order from the downstream side of the conveyance direction X1) arranged in the conveyance direction X1 by three partition plates 27 along a width direction Y (intersecting the conveyance direction X1). In this example, the volume of the lower chamber 29-1 on the downstream side is formed slightly larger than the volume of the lower chamber 29-2 on the upstream side. Rectangular openings 25*a* are formed in the support plate 25 at predetermined intervals along the conveyance direction X1.

A driven roller 31 is rotatably supported between the upstream end portions (the right end portions) of the front and rear side plates 21, and a driving roller 33 is rotatably supported between the downstream end portions (the left end portions). The driving roller 33 is connected to a motor (not shown).

Next, the conveying belt 11 will be described. The conveying belt 11 is an endless belt, and a number of through-holes penetrating in the thickness direction are formed over the entire surface. As shown in FIG. 1, the conveying belt 11 is wound around the driving roller 33 and the driven roller 31. When the driving roller 33 is driven by the motor to be rotated, the conveying belt 11 travels in the counterclockwise direction of FIG. 1. The outer surface of the conveying belt 11 along the upper track is a conveying surface on which the recording medium is conveyed.

Next, the conveying plate 13 will be described. The conveying plate 13 is in contact with the inner circumferential surface (the surface opposite to the conveying surface) of the conveying belt 11 traveling along the upper track to support the conveying belt 11. When the conveying belt 11 travels, the inner circumferential surface of the conveying belt 11 slides along the upper surface of the conveying plate 13.

As shown in FIG. 2, the conveying plate 13 is composed of a plurality of (in this example, four) rectangular plate pieces 41 (the first, second, third, and fourth plate pieces 41-1, 41-2, 41-3, and 41-4 arranged in order from the downstream side, in other words, from the side of the driving roller 33) arranged along the conveyance direction X1. Each plate piece 41 is made of aluminum or SUS. A number of through-holes penetrating in the thickness direction are formed over the entire surface of the plate pieces 41. The plate pieces 41 have the same width as the space between the front and rear side plates 21 and the same predetermined thickness. Further, the first plate piece 41-1 has the shortest length in the conveyance direction X, the fourth plate piece 41-4 has the second shortest length, and the second and third plate pieces 41-2, 41-3 have the same and the longest length.

As shown in FIG. 4, the downstream end portion (the left end portion) of the first plate piece 41-1 is bent downward. No through-hole is formed in the bent end portion. As shown in FIG. 5, the upstream end portion 41*a* (the right end portion) of the fourth plate piece 41-4 is bent downward.

As shown in FIG. 3 and FIG. 4, the four plate pieces 41 ride on the rails 21*a* formed on the front and rear side plates 21 of the frame 17, are connected in order by fixing members, and are supported by the support plate 25. As shown in FIG. 3, the fixing members includes two end fixing members 43 (the first and second end fixing members 43-1 and 43-2 in order from the downstream side, in other words, in order from the side of the driving roller 33), and three intermediate fixing members 45 (the first, second, and third intermediate fixing members 45-1, 45-2, and 45-3 in order from the downstream side, in other words, in order from the side of the driving roller 33). The height of the end fixing member 43 and the intermediate fixing member 45 is equal to the height from the support plate 25 of the frame 17 to the upper surface of the rails 21*a* formed on the front and rear side plates 21, and the width of the end fixing member 43 and the intermediate fixing member 45 is equal to the space between the rails 21*a* of the front and rear side plates 21.

As shown in FIG. 4, the end fixing member 43 has a U-shaped cross section, and has an upper plate 43*a* and a lower plate 43*b* parallel to each other and a vertical plate 43*c* perpendicular to the upper and lower plates 43*a* and 43*b*. The intermediate fixing member 45 has a Z-shaped cross section, and has an upper plate 45*a* and a lower plate 45*b* parallel to each other, and a vertical plate 45*c* perpendicular to the upper and lower plates 45*a* and 45*b*.

The upper plates 43*a*, 45*a* of the fixing members 43, 45 have slits along the width direction Y (FIG. 4 shows only the slits 45*d* of the upper plate 45*a* of the first intermediate fixing member 45-1). The lower plate 43*b* of the second end fixing member 43-2 and the lower plates 45*b* of the intermediate fixing members 45 have long-holes along the conveyance direction X at predetermined intervals in the width direction W (FIG. 4 shows only the long holes 45*e* of the lower plate 45*b* of the first intermediate fixing member 45-1).

As shown in FIG. 3, the first end fixing member 43-1 takes a posture in which the upper plate 43*a* and the lower plate 43*b* face the driven roller 31, and the second end fixing member 43-2 takes a posture in which the upper plate 43*a* and the lower plate 43*b* face the driving roller 33. The first to third intermediate fixing members 45-1, 45-2, and 45-3 take a posture in which the upper plate 45*a* faces the driving roller 33 while the lower plate 45*b* faces the driven roller 31.

As shown in FIG. 3, the downstream end portion of the first plate piece 41-1 is fixed to the first end fixing member 43-1, and the upstream end portion is fixed to the first intermediate fixing member 45-1. The downstream end portion of the second plate piece 41-2 (not shown in FIG. 3) is fixed to the first intermediate fixing member 45-1, and the upstream end portion is fixed to the second intermediate fixing member 45-2. The downstream end portion of the third plate piece 41-3 is fixed to the second intermediate fixing member 45-2, and the upstream end portion is fixed to the third intermediate fixing member 45-3. The downstream end portion of the fourth plate piece 41-4 is fixed to the third intermediate fixing member 45-3, and the upstream end portion is fixed to the second end fixing member 43-2.

It will be described in detail below. As shown in FIG. 4, the downstream end portion of the first plate piece 41-1 is fixed to the upper plate 43*a* of the first end fixing member 43-1 with screws B at a predetermined interval in the width direction Y, and the upstream end portion is fixed to the tip end side (the side of the driving roller 33) of the upper plate 45*a* of the first intermediate fixing member 45-1 with screws B at a predetermined interval in the width direction Y. The upper surface of each screw B does not protrude above the upper surface of the first plate piece 41-1. The lower plate 43*b* of the first end fixing member 43-1 is fixed to the support plate 25. On the other hand, the long holes 45*e* of the lower plate 45*b* of the first intermediate fixing member 45-1 are fitted around head pins 51 which are erected on the support plate 25 with a predetermined interval in the width direction Y. That is, the first intermediate fixing member 45-1 can move in a direction X2 (see FIG. 2, in this example, the direction opposite to the conveyance direction X1) parallel to the conveyance direction X1. Further, the heads of the head pins 51 restrict movement of the lower plate 45*b* of the first intermediate fixing member 45-1 in the upper-and-lower direction.

Further, the downstream end portion of the first plate piece 41-1 is positioned by the first end fixing member 43-1 so as to be as close as possible to the driving roller 33.

The downstream end portion of the second plate piece 41-2 is fixed to the base end side (the side of the driven roller 31) of the upper plate 45*a* of the first intermediate fixing member 45-1 with screws at a predetermined interval in the width direction Y, and the upstream end portion is fixed to the tip end side (the side of the driving roller 33) of the upper plate 45*a* of the second intermediate fixing member 45-2 with screws at a predetermined interval in the width direction Y. The upper surface of each screw does not protrude above the upper surface of the second plate piece 41-2. Here, the downstream end portion of the second plate piece 41-2 and the upstream end portion of the first plate piece 41-1 do not overlap in the thickness direction. The long holes 45*e* of the lower plate 45*b* of the second intermediate fixing member 45-2 is fitted around head pins 51 which are erected on the support plate 25 with a predetermined interval in the width direction Y. As described above, the second intermediate fixing member 45-2 can also move in the direction X2 parallel to the conveyance direction X1. Further, the head pins 51 restrict movement of the lower plate 45*b* of the second intermediate fixing member 45-2 in the upper-and-lower direction.

The downstream end portion of the third plate piece 41-3 is fixed to the base end side (the side of the driven roller 31) of the upper plate 45*a* of the second intermediate fixing member 45-2 with screws at a predetermined interval in the width direction Y, and the upstream end portion is fixed to the tip end side (the side of the driving roller 33) of the upper plate 45*a* of the third intermediate fixing member 45-3 with screws at a predetermined interval in the width direction Y. Again, the upper surface of each screw does not protrude above the upper surface of the third plate piece 41-3. Further, the downstream end portion of the third plate piece 41-3 and the upstream end portion of the second plate piece 41-2 do not overlap in the thickness direction. The long holes 45*e* of the lower plate 45*b* of the third intermediate fixing member 45-3 are fitted around head pins 51 which are erected on the support plate 25 with a predetermined interval in the width direction Y. As described above, the third intermediate fixing member 45-3 can also move in the direction X2 parallel to the conveyance direction X1. Further, the heads of the head pins 51 restrict movement of the lower plate 45*b* of the third intermediate fixing member 45-3 in the upper-and-lower direction.

The downstream end portion of the fourth plate piece 41-4 is fixed to the base end side (the side of the driven roller 31) of the upper plate of the third intermediate fixing member 45-3 with screws at a predetermined interval in the width direction Y, and the upstream end portion is fixed to the upper plate 43*a* of the second end fixing member 43-2 with screws at a predetermined interval in the width direction Y. Again, the upper surface of each screw does not protrude above the upper surface of the fourth plate piece 41-4. Further, the downstream end portion of the fourth plate piece 41-4 and the upstream end portion of the third plate piece 41-3 do not overlap in the thickness direction. The long holes 43*e* of the lower plate 43*b* of the second end fixing member 43-2 are fitted around head pins 51 which are erected on the support plate 25 with a predetermined interval in the width direction Y. As described above, the second end fixing member 43-2 can also move in the direction X2 parallel to the conveyance direction X1. Further, the heads of the head pins 51 restrict movement of the lower plate 43*b* of the second end fixing member 43-2 in the upper-and-lower direction.

As shown in FIG. 5, the upstream end portion of the fourth plate piece 41-4 and the driven roller 31 are spaced apart with a predetermined interval. This interval is set to be equal to or larger than the amount (in one example, 2 mm or more) by which the conveying plate 13 thermally expands under a high temperature environment by the heating device 5 described later.

As described above, the first end fixing member 43-1 is fixed to the support plate 25, and the first to third intermediate fixing members 45-1, 45-2, and 45-3 and the second end fixing member 43-2 can move from the side of the driving roller 33 to the side of the driven roller 31 along the direction X2 parallel to the conveyance direction X1.

Further, as shown in FIG. 1 and FIG. 3, the space between the conveying plate 13 and the support plate 25 is divided into four upper chambers 61 (the first, second, third and fourth upper chambers 61-1, 61-2, 61-3, and 61-4, in order from the downstream side, in other words, in order from the side of the driving roller 33) arranged in the conveyance direction X1 by the end fixing members 43 and the intermediate fixing members 45. These upper chambers 61 communicate with one of the lower chambers 29 through the openings 25*a* formed in the support plate 25. In this example, the first upper chamber 61-1 has the smallest volume, the fourth upper chamber 61-4 has the second smallest volume, and the second and third upper chambers 61-2 and 61-3 have the same and the largest volume.

Next, the suction device 15 will be described. As shown in FIG. 1, the suction device 15 is disposed in each of the lower chambers 29-1, 29-2 of the frame 17. When the suction device 15 is driven, air in the through-holes of the conveying belt 11 and the through-holes of the conveying plate 13 is taken in through the openings 25*a* formed in the support plate 25 and the first to fourth upper chambers 61-1, 61-2, 61-3, and 61-4.

Next, the heating device 5 will be described. As shown in FIG. 1, the heating device 5 is disposed above the conveying unit 3, and includes a plurality of air blowing fans 71 and a heater unit 73. The air blowing fan 71 takes in air and generates a downward air flow. The heater unit 73 heats the generated air flow.

The drying operation of the drying apparatus 1 having the above structure will be described. In the conveying unit 3, the driving roller 33 is driven to be rotated, and the conveying belt 11 travels. Thereafter, the recording medium on which the image is formed by the inkjet method is conveyed on the conveying surface of the conveying belt 11. The suction devices 15 are driven. Thus, as described above, the air in the through-holes of the conveying belt 11 and the through-holes of the conveying plate 13 is taken in through the first to fourth upper chambers 61-1, 61-2, 61-3, and 61-4 and the openings 25*a* formed in the support plate 25, and a pressure of the space above the conveying surface of the conveying belt 11 becomes negative. Then, the recording medium is attracted to the conveying surface. Thus, the recording medium is conveyed along the conveyance direction X1 while being attracted to the conveying surface.

As shown in FIG. 3 and FIG. 4, although the plate pieces 41 overlap the upper plates 43*a* and 45*a* of the fixing members 43 and 45, the slits 45*d* (see FIG. 3) are formed along the width direction Y in the upper plates 43*a* and 45*a*, and the slits 45*d* communicate with the through-holes of the plate pieces 41. Therefore, even at the portion where the plate pieces 41 and the upper plates 43*a* and 45*a* of the fixing members 43 and 45 overlap, the air is taken in through the slits 45*d* and the through-holes, so that the recording medium can be attracted to the conveying belt 11.

Further, the air blowing fan 71 and the heater unit 73 of the heating device 5 are driven. The air taken in by the air blowing fan 71 is blown downward. The blown air is heated by the heater unit 73, and the heated air is blown against the recording medium conveyed by the conveying unit 3 to dry the ink of the recording medium.

Under the high temperature environment in which the heating device 5 is driven in this manner, the conveying plate 13 (the first to fourth plate pieces 41-1, 41-2, 41-3, and 41-4) may also be heated to a high temperature and thermally expanded. When each plate piece 41 thermally expands in the direction X2 parallel to the conveyance direction X1, the end portion of the first plate piece 41-1 on the side of the driving roller 33 (the first end fixing member 43-1) is fixed while the end portion on the side of the driven roller 31 (the first intermediate fixing member 45-1) can move in the direction X2 parallel to the conveyance direction X1, so that the end portion on the side of the driven roller 31 extends to the side of the driven roller 31 with respect to the end portion on the side of the driving roller 33. On the other hand, both end portions (the first to third intermediate fixing members 45-1, 45-2, and 45-3, the second end fixing member 43-2) of the second to fourth plate pieces 41-2, 42-3, and 41-4 can move in the direction X2 parallel to the conveyance direction X1, so that they move to the side of the driven roller 31 and also extend to the side of the driven roller 31 with the extension of the first plate piece 41-1. As a result, the conveying plate 13 is extended from the side of the driving roller 33 to the side of the driven roller 31 as a whole.

Further, the movement of the first to third intermediate fixing members 45-1 to 45-3 and the second end fixing member 43-2 in the upper-and-lower direction is restricted, so that the upward deformation of the plate pieces 41 is also restricted.

Even when the conveying plate 13 is extended in this manner, since the upstream end portion of the fourth plate piece 41-4 and the driven roller 31 are spaced apart (see FIG. 5), the fourth plate piece 41-4 does not interfere with the driven roller 31. Further, even if the fourth plate piece 41-4 is close to the driven roller 31 in the state that the conveying plate 13 is extended, the upstream end portion 41*a* of the fourth plate piece 41-4 is bent downward (see FIG. 5), so that it does not come into contact with the conveying belt 11 and does not prevent the conveying belt 11 from traveling.

When the temperature around the conveying plate 13 becomes lower than the predetermined temperature, the conveying plate 13 contracts to the side of the driving roller 33 and returns to its original length.

As is apparent from the above description, according to the drying apparatus 1 of the present disclosure, when the conveying plate 13 is thermally expanded under a high temperature environment, the expansion and contraction of the conveying plate 13 in the direction X2 parallel to the conveyance direction X1 is permitted, so that the flowing of the conveying plate 13 is suppressed. Therefore, the recording medium can be conveyed without lowering the force for attracting the recording medium by the suction device 15.

Since one end portion of the conveying plate 13 is fixed, it extends from one end portion to the other end portion when thermally expanded. For example, when one end portion of the conveying plate 13 is not fixed, if the plate pieces 41 may be extended in different directions (the conveying direction X1 or the opposite direction X2) during the thermal expansion, the extension of the conveying plate 13 as a whole becomes unstable. In the present disclosure, since one end portion of the conveying plate 13 is fixed, all plate pieces 41 extend in the same direction from one end portion to the other end portion. Therefore, the conveying plate 13 can be stably expanded and contracted.

Further, one end portion of the conveying plate 13 on the side of the driving roller 33 is fixed. The rotating shaft of the driving roller 33 is coaxially connected to the output shaft of the motor provided in the apparatus main body (not shown) of the drying apparatus 1. Therefore, the driving roller 33 is positioned with a higher accuracy than the driven roller 31. Then, by fixing the end portion of the conveying plate 13 on the side of the driving roller 33, even when the conveying plate 13 is thermally expanded, the conveying plate 13 can be extended from the side of the driving roller 33 to the side of the driven roller 31 while maintaining the positional relationship between the end portion of the conveying plate 13 on the side of the driving roller 33 and the driving roller 33. Further, by making the conveying plate 13 and the driving roller 33 as close as possible, the recording medium can be attracted to the conveying plate 13 as close to the downstream end of the conveyance direction X1 as possible, so that the recording medium can be stably conveyed to the downstream side of the drying apparatus 1.

The conveying plate 13 also thermally expands in the width direction Y, but since the length along the width direction Y is shorter than the length along the conveyance direction X1, it is hardly affected by thermal expansion.

The conveying plate 13 includes the plurality of plate pieces 41 connected through the intermediate fixing members 45, and the intermediate fixing members 45 ais movably supported in the direction X2 parallel to the conveyance direction X1. As a result, since the upper surfaces of the plate pieces 41 are easily made to be flat, the plate pieces 41 can be connected each other without preventing the sliding performance of the conveying belt 11 and the conveying plate 13. Since the fixing members 43 and 45 move along the long hole along the conveyance direction X1, the plate pieces 41 are also stably expandable and contractable in the direction X2 parallel to the conveyance direction X1. The number of plate pieces 41 is not limited to four.

In addition, in order for the fixing members 43 and 45 to move smoothly when the conveying plate 13 is expanded or contracted, a member having good sliding property may be affixed to the lower surfaces of the lower plates 43*b* and 45*b* of the fixing members 43 and 45, or a hemispherical projection may be formed on the lower surfaces of the lower plates 43*b* and 45*b* to narrow the contact area between the fixing members 43 and 45 and the support plate 25.

Although the present disclosure has been described in particular embodiments, the present disclosure is not limited to the foregoing embodiments. To the extent that it does not deviate from the scope and object of the present disclosure, the foregoing embodiments may be variously changed, substituted, or modified, and the claims include all embodiments that may fall within the scope of technical thought.

The invention claimed is:

1. A drying apparatus which dries a medium having an image under a high temperature environment while conveying the medium, the drying apparatus comprising:

an endless conveying belt having a number of through-holes, and supporting the medium and conveying the medium in a predetermined conveyance direction;

a conveying plate having a number of through-holes and supporting the conveying belt in contact with an inner circumferential surface of the conveying belt; and a suction device which sucks air through the through-holes of the conveying belt and the through-holes of the conveying plate to attract the medium to the conveying plate, wherein the conveying plate is formed so as to be expandable and contractable in a direction parallel to the conveyance direction.

2. The drying apparatus according to claim 1, further comprising:

a driving roller and a driven roller around which the conveying belt is wound, wherein one end of the conveying plate on a side of the driving roller is fixedly supported while the other end of the conveying plate on a side of the driven roller is movably supported.

3. The drying apparatus according to claim 2, wherein an expandable and contractable amount of the conveying plate is equal to or larger than an amount that the conveying plate thermally expands in the direction parallel to the conveyance direction between the driving roller and the driven roller due to an increase in temperature when the medium is dried.

4. The drying apparatus according to claim 1, wherein the conveying plate contains a plurality of plate pieces coupled in the conveyance direction via fixing members, and the fixing member is supported so as to be movable in the direction parallel to the conveyance direction.

5. The drying apparatus according to claim 4, further comprising:

a support plate by which the fixing members are supported, wherein the supporting plate has pins disposed apart from each other in a direction: perpendicular to the conveyance direction, and the fixing member has long-holes along the conveyance direction through which the pins are passed.

6. The drying apparatus according to claim 5, wherein the fixing member has an upper plate and a lower plate which are parallel to each other, and a vertical plate perpendicular to the upper and lower plates, and the upper plate is fixed to the plate piece, and the long-hole is formed in the lower plate.

7. The drying apparatus according to claim 6, wherein the pin restricts movement of the lower plate with respect to the support plate in an upper-and-lower direction.

8. The drying apparatus according to claim 2, wherein the driving roller is disposed on a downstream side in the conveyance direction, and the driven roller is disposed on an upstream side in the conveyance direction, and an upstream side end portion of the conveying plate in the conveyance direction is curved downward.

* * * * *